United States Patent
Lee et al.

(10) Patent No.: US 12,417,392 B2
(45) Date of Patent: Sep. 16, 2025

(54) APPARATUS AND SYSTEM FOR TRAINING KNOWLEDGE TRACKING MODEL BASED ON DATA AUGMENTATION AND OPERATION METHOD THEREOF

(71) Applicant: RIIID INC., Seoul (KR)

(72) Inventors: See Woo Lee, Chungju-si (KR); Young Duck Choi, Seoul (KR); Byung Soo Kim, Seoul (KR); June Young Park, Yongin-si (KR)

(73) Assignee: RIIID INC., Seoul (KR)

( * ) Notice: Subject to any disclaimer, the term of this patent is extended or adjusted under 35 U.S.C. 154(b) by 840 days.

(21) Appl. No.: 17/687,953

(22) Filed: Mar. 7, 2022

(65) Prior Publication Data

US 2022/0284315 A1    Sep. 8, 2022

(30) Foreign Application Priority Data

Mar. 8, 2021  (KR) .......... 10-2021-0029909

(51) Int. Cl.
*G06N 5/022*    (2023.01)
*G06N 5/04*    (2023.01)

(52) U.S. Cl.
CPC .............. *G06N 5/022* (2013.01); *G06N 5/04* (2013.01)

(58) Field of Classification Search
None
See application file for complete search history.

(56) References Cited

FOREIGN PATENT DOCUMENTS

KR    10-2186641 B1    12/2020

OTHER PUBLICATIONS

"Deep Knowledge Tracing," Piech et al; Piech (Year: 2015).*
"A survey on Image Data Augmentation for Consistency Training," Shorten et al; Shorten (Year: 2009).*
(Continued)

*Primary Examiner* — Schyler S Sanks
*Assistant Examiner* — Paul J Breene
(74) *Attorney, Agent, or Firm* — Sughrue Mion, PLLC (57) ABSTRACT

Provided is an apparatus for training a knowledge tracking model, which is an apparatus for predicting a correct answer probability of a user on the basis of data augmentation, the apparatus including: a problem-solving data storage unit configured to store problem-solving data in which a problem solved by a user and a response of the user to the problem are mapped; a data augmentation performing unit configured to receive the problem-solving data from the problem-solving storage unit and convert the problem-solving data to generate augmented data; a regularization performing unit configured to receive the augmented data from the data augmentation performing unit and perform a regularization operation using a regularization loss function determined on the basis of a data augmentation method that is performed; and a model training unit configured to input the augmented data to a knowledge tracking model, allow the knowledge tracking model to learn a weight representing a relationship between a problem-solving record included in the augmented data and a correct answer probability of the user, and train the knowledge tracking model for predicting a correct answer probability of the user for a specific problem on the basis of the weight.

6 Claims, 8 Drawing Sheets

(56) References Cited

OTHER PUBLICATIONS

"Unsupervised Data Augmentation for Consistency Training," Xie et al; Xie (Year: 2019).*
"A smoothed monotonic regression via L2 regularization," Sysoev et al; Sysoev (Year: 2019).*
Akari Asai et al, "Logic-Guided Data Augmentation and Regularization for Consistent Question Answering", arXiv:2004.10157v2 [cs.CL], May 25, 2020, pp. 1-9.
Qianying Liu et al., "RODA: Reverse Operation based Data Augmentation for Solving Math Word Problems", arXiv:2010.01556v1 [cs.CL], Oct. 4, 2020, Journal of Latex Class Files, Aug. 2015, pp. 1-11, vol. 14, No. 8.

* cited by examiner

APPARATUS AND SYSTEM FOR TRAINING KNOWLEDGE TRACKING MODEL BASED ON DATA AUGMENTATION AND OPERATION METHOD THEREOF

CROSS-REFERENCE TO RELATED APPLICATION

This application claims priority to and the benefit of Korean Patent Application No. 10-2021-0029909, filed on Mar. 8, 2021, the disclosure of which is incorporated herein by reference in its entirety.

BACKGROUND

1. Field of the Invention

The present invention relates to an apparatus and a system for training a knowledge tracking model, which are capable of training a knowledge tracking model based on data augmentation, and an operation method thereof.

2. Discussion of Related Art

Recently, the Internet and electronic devices have been actively used in each field, and the educational environment is also changing rapidly. In particular, with the development of various educational media, learners may choose and use a wider range of learning methods. Among the learning methods, education services through the Internet have become a major teaching and learning method by overcoming time and space constraints and enabling low-cost education.

To keep up with the trend, customized education services, which are not available in offline education due to limited human and material resources, are also diversifying. For example, artificial intelligence (AI) is used to provide educational content that is subdivided according to the individuality and skill of a learner so that the educational content is provided according to the individual competency of the learner, which departs from standardized education methods of the past.

A knowledge tracking model is an AI model that models the degree of knowledge acquisition of a student on the basis of a learning trajectory of the student. Specifically, the knowledge tracking model refers to, given a record of a problem solved by a student and a response of the student, predicting the probability of the next given problem being answered correctly.

Such a deep learning-based knowledge tracking model suffers from overfitting that easily occurs as the size of training data is small. Overfitting refers to over-training an AI model with training data. Since it is impossible to collect all pieces of real data, AI models are generally trained only with training data, which is a subset of real data. Consequently, the AI model trained with insufficient training data focuses only on the training data, resulting in poor prediction accuracy with respect to real data.

In order to solve the limitation of overfitting, a data augmentation technique that transforms existing data to generate virtual training data, or a regularization technique that limits the number of parameters of a model or restricts an output value of the model using a specific loss function may be used to prevent overfitting of the model.

However, there is a lack of research about data augmentation or regularization techniques suitable for knowledge tracking models to evaluate skills of students in online education, and in particular, in an education domain lacking problem-solving data of users, prediction accuracy is low due to overfitting.

SUMMARY OF THE INVENTION

The present invention is directed to providing an apparatus and a system for training a knowledge tracking model, which may resolve the overfitting of a knowledge tracking model and increase prediction performance by replacing each problem of collected problem-solving data with a predetermined probability, or inserting or deleting a specific problem-solving record to generate new training data, and an operation method thereof.

The present invention is directed to providing an apparatus and a system for training a knowledge tracking model, which may resolve the overfitting of 7a knowledge tracking model and increase prediction performance by defining a regularization loss function according to a data augmentation method, comparing a model prediction value through the original problem-solving data with a model prediction value through augmented data, and performing regularization, and an operation method thereof.

The present invention is directed to providing an apparatus and a system for training a knowledge tracking model, which may resolve the overfitting more effectively by determining the data augmentation method or the number of augmentations according to overfitting factors that may affect the predictive performance of a model, such as the number of pieces of data in a problem-solving database, a sequence length of problem-solving data, and the percentage of 1 or 0, and an operation method thereof.

The technical objectives of the present invention are not limited to the above, and other objectives may become apparent to those of ordinary skill in the art based on the following descriptions.

According to an aspect of the present invention, there is provided an apparatus for training a knowledge tracking model, which is an apparatus for predicting a correct answer probability of a user on the basis of data augmentation, the apparatus including: a problem-solving data storage unit configure to store problem-solving data in which a problem solved by a user and a response of the user to the problem are mapped; a data augmentation performing unit configured to receive the problem-solving data from the problem-solving storage unit and convert the problem-solving data to generate augmented data; a regularization performing unit configured to receive the augmented data from the data augmentation performing unit and perform a regularization operation using a regularization loss function determined on the basis of a data augmentation method that is performed; and a model training unit configured to input the augmented data to a knowledge tracking model, allow the knowledge tracking model to learn a weight representing a relationship between a problem-solving record included in the augmented data and a correct answer probability of the user, and train the knowledge tracking model for predicting a correct answer probability of the user for a specific problem on the basis of the weight.

According to an aspect of the present invention, there is provided an operation method of an apparatus for training a knowledge tracking model, the method including: storing problem-solving data in which a problem solved by a user and a response of the user to the problem are mapped; converting the problem-solving data to generate augmented data and performing a regularization operation using a regularization loss function determined on the basis of a data augmentation method that is performed; and inputting the augmented data to a knowledge tracking model, allowing the knowledge tracking model to learn a weight representing a relationship between a problem-solving record included in the augmented data and a correct answer probability of the user, and training the knowledge tracking model for predicting a correct answer probability of the user for a specific problem on the basis of the weight.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, embodiments of the present invention will be described in detail with reference to the accompanying drawings. In the drawings, the same parts throughout the drawings will be assigned the same number, and redundant descriptions thereof will be omitted.

It should be understood that, when an element is referred to as being "connected to" or "coupled to" another element, the element can be directly connected or coupled to another element, or an intervening element may be present. Conversely, when an element is referred to as being "directly connected to" or "directly coupled to" another element, there are no intervening elements present.

In the description of the embodiments, the detailed description of related known functions or constructions will be omitted herein to avoid making the subject matter of the present invention unclear. In addition, the accompanying drawings are used to aid in the explanation and understanding of the present invention and are not intended to limit the scope and spirit of the present invention and cover all modifications, equivalents, and alternatives falling within the spirit and scope of the present invention.

Specific embodiments are shown by way of example in the specification and the drawings and are merely intended to aid in the explanation and understanding of the technical spirit of the present invention rather than limiting the scope of the present invention. Those of ordinary skill in the technical field to which the present invention pertains should be able to understand that various modifications and alterations may be made without departing from the technical spirit or essential features of the present invention.

Figure 1:
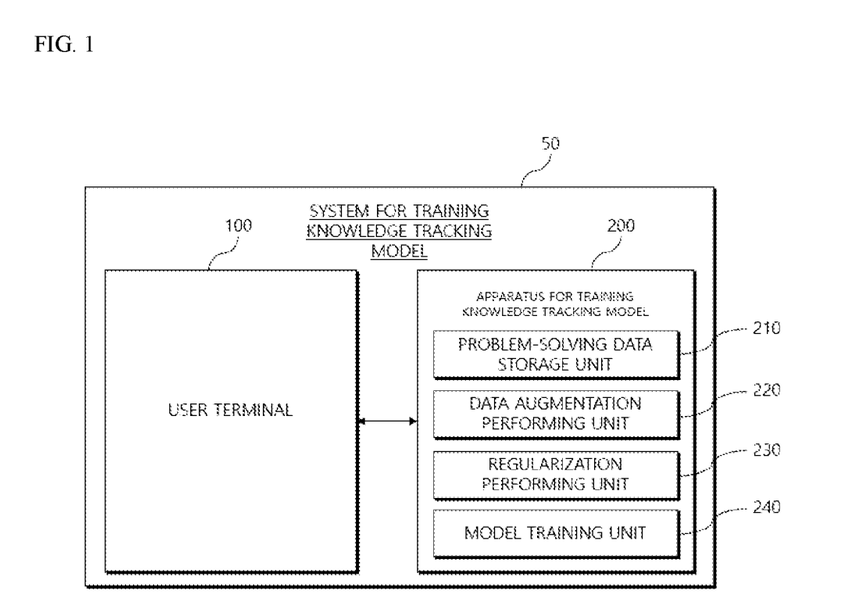
FIG. 1 is a block diagram illustrating an operation of a system for training a knowledge tracking model according to an embodiment of the present invention.

FIG. 1 is a block diagram illustrating an operation of a system for training a knowledge tracking model according to an embodiment of the present invention.

Referring to FIG. 1, a system 50 for training a knowledge tracking model according to the embodiment of the present invention may include a user terminal 100 and an apparatus 200 for training a knowledge tracking model.

The knowledge tracking model may be trained using problem-solving data of users having different skills and may predict the correct answer probability of the user when a new problem is given at a later time. However, when the training data is insufficient, the knowledge tracking model may be over-focused on the training data and fail to accurately predict the correct answer probability for actual problem-solving data other than the training data.

In order to address such a limitation, the apparatus 200 for training a knowledge tracking model according to the embodiment of the present invention may collect problem-solving data from the user terminal 100 and perform data augmentation and regularization according to a preset algorithm. New data generated by performing data augmentation on the problem-solving data may be augmented data.

The knowledge tracking model may be trained on the basis of the augmented data. Thereafter, the apparatus 200 for training a knowledge tracking model may, upon receiving problem-solving data from the user terminal 100, predict a correct answer probability, that is, the probability of a specific problem being correctly answered by the user, on the basis of the knowledge tracking model from augmented problem-solving data.

The problem-solving data may be data in which a problem and a solving result of the user for the problem are mapped. The problem-solving data may include a sequence of sets of one or more problems solved by the user and responses to the one or more problems.

The apparatus 200 for training a knowledge tracking model may include a problem-solving data storage unit 210, a data augmentation performing unit 220, a regularization performing unit 230, and a model training unit 240.

The problem-solving data storage unit 210 may store problem-solving data in which problems solved by the user and responses of the user to the problems are mapped.

The problem-solving data storage unit 210 may, whenever the user solves a problem, receive the problem-solving data from the user terminal 100 and store the received problem-solving data. In addition, the problem-solving data storage unit 210 may directly receive a problem-solving data set from an administrator without going through the user terminal 100 and store the received problem-solving data set.

The problem-solving data storage unit 210 may update the stored problem-solving data whenever the user solves a problem or whenever problem-solving data is directly input from the administrator.

The data augmentation performing unit 220 may receive problem-solving data from the problem-solving data storage unit 210 and convert the problem-solving data to generate augmented data. Algorithms for generating the augmented data may include any processing that converts data into a form to improve the performance of deep learning machine learning structures.

In an embodiment of the present invention, data augmentation may include an operation of replacing some or all of problem-solving records of the problem-solving data with a predetermined probability, or inserting or deleting some or all of problem-solving records of the problem-solving data.

1) For replacement, some of the problems actually solved by the user may be replaced with similar problems that are not actually solved through replacement. Replacement is based on the assumption that users have similar learning trajectories for similar problems, and therefore the correct answer probabilities for similar problems do not change significantly.

For example, in response to a problem Q1 being correctly answered by a user, a problem-solving record of the problem Q1 in the problem-solving data is deleted and a record of a problem Q1a similar in type and difficulty that has been correctly answered is kept.

In an embodiment, the similar problem may be a problem having the highest correct answer probability resulting from artificial intelligence prediction, among problems included in a problem set having the same type and difficulty. However, the selection of similar problems is not limited thereto and may be defined in various ways according to embodiments.

Through the replacement, by assuming and recording the user has solved a similar problem that has not been actually solved, there is an effect of increasing the training data of the knowledge tracking model.

2) For insertion, a virtual problem-solving record for a problem that has not been solved by the user may be additionally inserted into the existing problem-solving records of the problem-solving data. When the additional problem is recorded as being correctly answered, the predicted correct answer probability of the knowledge tracking model may increase. Conversely, when the additional problem is recorded as being incorrectly answered, the predicted correct answer probability of the knowledge tracking model may decrease.

3) For deletion, some or all of the existing problem-solving records of the problem-solving data may be deleted. When the deleted problem is a problem that has been correctly answered by the user, the predicted correct answer probability of the knowledge tracking model may decrease. Conversely, when the deleted problem is a problem that has been incorrectly answered by the user, the predicted correct answer probability of the knowledge tracking model may increase.

The insertion and the deletion is based on the assumption that the higher the number of problems answered correctly by the user, the higher the predicted correct answer probability, and conversely, the higher the number of problems answered incorrectly by the user, the lower the predicted correct answer probability.

According to an embodiment, each of the augmentation methods of replacement, insertion, and deletion may be performed simultaneously at least once. For example, the replacement augmentation may be performed two times to generate two pieces of augmented data, the insertion augmentation may be performed one time to generate one piece of augmented data, and the deletion augmentation may be performed three times to generate three pieces of augmented data. As described above, a total of six pieces of augmented data may be generated from one piece of problem-solving data.

In an embodiment, the insertion or deletion may be performed after fixing the response as being correctly solved or incorrectly solved to perform the data augmentation.

For example, while performing a data augmentation of inserting a problem-solving record with the solving result fixed as being correct, regularization may be performed in a direction to define a regularization loss function such that the correct answer probability gradually increases. Alternatively, while performing a data augmentation of deleting a problem-solving record with the solving result fixed as being incorrect, regularization may be performed in a direction to define a regularization loss function such that the correct answer probability gradually increases.

Data augmentations such as replacement, insertion, and deletion may be performed selectively or in combination depending on various factors (e.g., the number of pieces of data in the problem-solving database, the length of the problem-solving data sequence, the percentage of 1 or 0 in the problem-solving data, and the like) that may cause overfitting. The selection of the augmentation processing method will be described in more detail with reference to the description of FIGS. 6 and 7 to be described below.

The knowledge tracking model trained on the basis of the augmented data may exhibit predictive performance that is not biased by characteristics of specific training data under limited training data. The data augmentation methods of replacement, insertion, and deletion will be described in more detail with reference to FIG. 4 to be described below.

The regularization performing unit 230 may receive the augmented data from the data augmentation performing unit 220 and perform a regularization operation using a regularization loss function determined according to the performed data augmentation method.

The regularization operation may be an operation of limiting the number of parameters of the knowledge tracking model or restricting the output value of the model using a preset regularization loss function.

In an embodiment, the regularization operation may include consistency regularization and monotonicity regularization. The consistency regularization may be a regularization technique for augmented data generated by "replacement" among the data augmentation methods. The monotonicity regularization may be a regularization technique for augmented data generated by "insertion" or "deletion" among the data augmentation methods.

The regularization loss function may include a consistency regularization loss function and a monotonicity regularization loss function.

Figure 2:
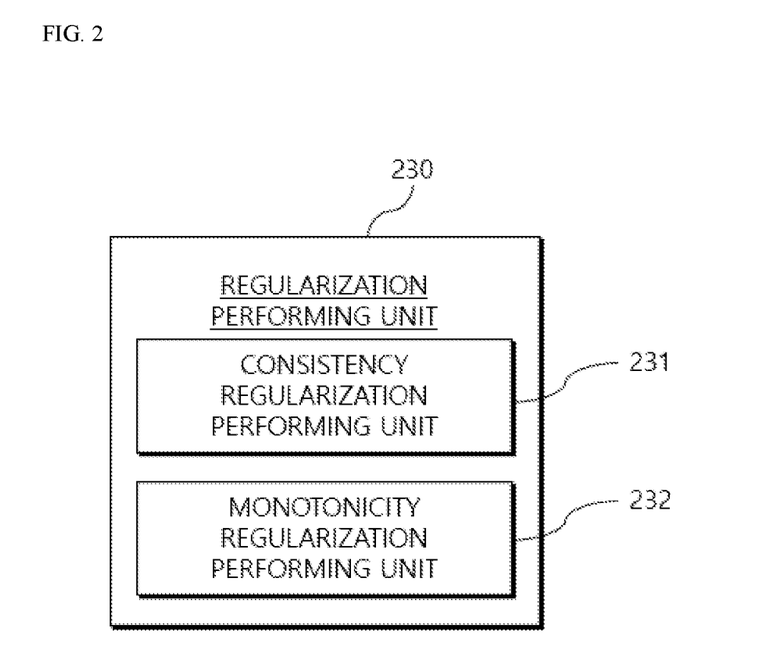
FIG. 2 is a detailed block diagram for describing an operation of a regularization performing unit shown in FIG. 1.

FIG. 2 is a detailed block diagram for describing the operation of the regularization performing unit shown in FIG. 1. Referring to FIG. 2, the regularization performing unit 230 may include a consistency regularization performing unit 231 and a monotonicity regularization performing unit 232.

The consistency regularization performing unit 231 may perform consistency regularization on augmented data generated through replacement. The monotonicity regularization performing unit 232 may perform monotonicity regularization on augmented data generated through insertion or deletion.

The consistency regularization and the monotonicity regularization may optimize parameters using different regularization loss functions.

The consistency regularization operation may use a consistency regularization loss function that compares a predicted correct answer probability for the original problem-solving data with a predicted correct answer probability for problem-solving data newly generated through a data augmentation, and trains the knowledge tracking model in a direction to reduce the difference (loss).

For example, when the predicted correct answer probability for non-augmented problem-solving data is 0.90 and the predicted correct answer probability for augmented data is 0.85, the weight of the knowledge tracking model may be adjusted in a direction to reduce the difference of 0.05.

The monotonicity regularization operation may use a monotonicity regularization loss function that compares a predicted correct answer probability of problem-solving data with a predicted correct answer probability of newly generated problem-solving data and applies an inductive bias, which is monotonicity, to the knowledge tracking model.

For example, a loss function may be defined such that the predicted correct answer probability increases as more and more records of correctly solved problems are added through insertion. Alternatively, a monotonicity regularization loss function may be defined such that the predicted correct answer probability decreases as more and more records of incorrectly solved problems are added through insertion.

In the case of deletion, a loss function may be defined such that the predicted correct answer probability decreases as more and more records of correctly answered problems are deleted. Alternatively, a loss function may be defined such that the predicted correct answer probability increases as more and more records of incorrectly answered problems are deleted.

The model training unit 240 may train the knowledge tracking model by inputting the augmented data into the knowledge tracking model, and adjusting a weight indicating a relationship between the problem-solving record and the correct answer probability of the user included in the augmented data.

The knowledge tracking model may be trained to predict the correct answer probability of the user for a specific problem on the basis of the weight determined as a result of the training.

According to the embodiment of the present invention, new training data is generated by replacing each problem included in the collected problem-solving data with a predetermined probability, or inserting or deleting problems so that the training data of the knowledge tracking model may be increased, thereby providing an effect of resolving overfitting and increasing predictive performance.

In addition, according to the embodiment of the present invention, an optimal regularization loss function is defined according to the data augmentation method and a regularization operation is performed, thereby providing an effect of resolving the overfitting of the knowledge tracking model and increasing predictive performance.

Figure 3:
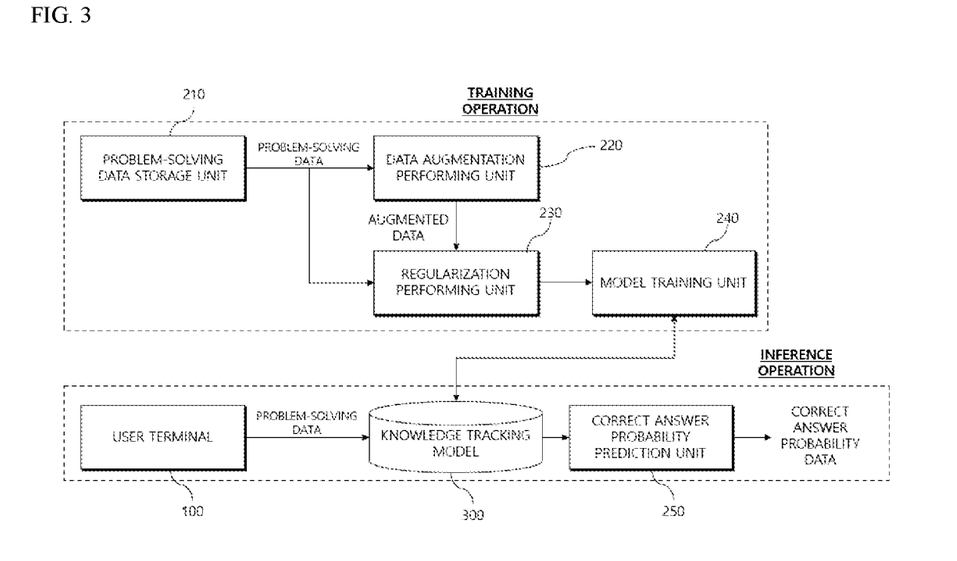
FIG. 3 is a detailed block diagram for describing operations of the system for training a knowledge tracking model in a training operation and an inference operation.

FIG. 3 is a detailed block diagram for describing operations of the system for training a knowledge tracking model in a training operation and an inference operation.

Referring to FIG. 3, in the training operation, the problem-solving data storage unit 210 may transmit problem-solving data to the data augmentation performing unit 220 and the regularization performing unit 230.

The data augmentation performing unit 220 may receive the problem-solving data from the problem-solving data storage unit 210 and convert the problem-solving data according to a preset algorithm to generate augmented data. Algorithms for generating the augmented data may include any processing that converts data into a form to improve the performance of deep learning machine learning structures.

In the embodiment of the present invention, the data augmentation performing unit 220 may generate the augmented data according to at least one method among replacement, insertion, and deletion in consideration of overfitting factors that affect the performance of the knowledge tracking model.

The overfitting factors may include the number of pieces of data in the problem-solving data storage, the length of the problem-solving data sequence, and the percentage of 1 or 0 in the problem-solving data.

The regularization performing unit 230 may receive augmented data from the data augmentation performing unit 220 and may receive problem-solving data from the problem-solving data storage unit 210.

Thereafter, the regularization performing unit 230 may compare a correct answer probability predicted in a model trained using the problem-solving data with a correct answer probability predicted in a model trained using the augmented data, and train the knowledge tracking model according to a preset loss function.

The regularization operation may be an operation of limiting the number of parameters of the AI model or restricting the output value of the model using a predefined loss function. In the embodiment, the regularization operation may include consistency regularization and monotonicity regularization.

The consistency regularization may be a regularization technique for augmented data generated by "replacement" among the data augmentation methods. The monotonicity regularization may be a regularization technique for augmented data generated by "insertion" or "deletion" among the data augmentation methods.

The consistency regularization and the monotonicity regularization may optimize parameters using different loss functions.

The consistency regularization operation may use a consistency regularization loss function that compares a predicted correct answer probability for original problem-solving data with a predicted correct answer probability for problem-solving data newly generated through a data augmentation, and trains the knowledge tracking model in a direction to reduce the difference (loss).

The monotonicity regularization operation may use a monotonicity regularization loss function that compares a predicted correct answer probability for problem-solving data with a predicted correct answer probability for newly generated problem-solving data and applies an inductive bias, which is monotonicity, to the knowledge tracking model.

A correct answer probability prediction unit 250 may predict the correct answer probability of a user for a given problem through the knowledge tracking model trained on the basis of the problem-solving data and the augmented data.

However, according to an embodiment, the correct answer probability prediction unit 250 may predict various educational elements of the online environment, such as a test score to be obtained by the user, a grade, and the probability of departure during learning, in addition to the correct answer probability.

The knowledge tracking model 300 for which training is completed using the problem-solving data and the augmented data may be used to, upon receiving problem-solving data of a user, predict the correct answer probability for a problem that has not been solved by the user.

In the inference operation, the user may solve a problem through the user terminal 100 and transmit problem-solving data to the knowledge tracking model 300.

Based on the problem-solving data being received by the knowledge tracking model 300, the correct answer probability prediction unit 250 may calculate the probability that a problem having not been solved by the user is correctly answered. The predicted correct answer probability may be used to determine a problem to be recommended to the user, thereby providing an effect of recommending a problem that may maximize the learning efficiency for the user.

Figure 4:
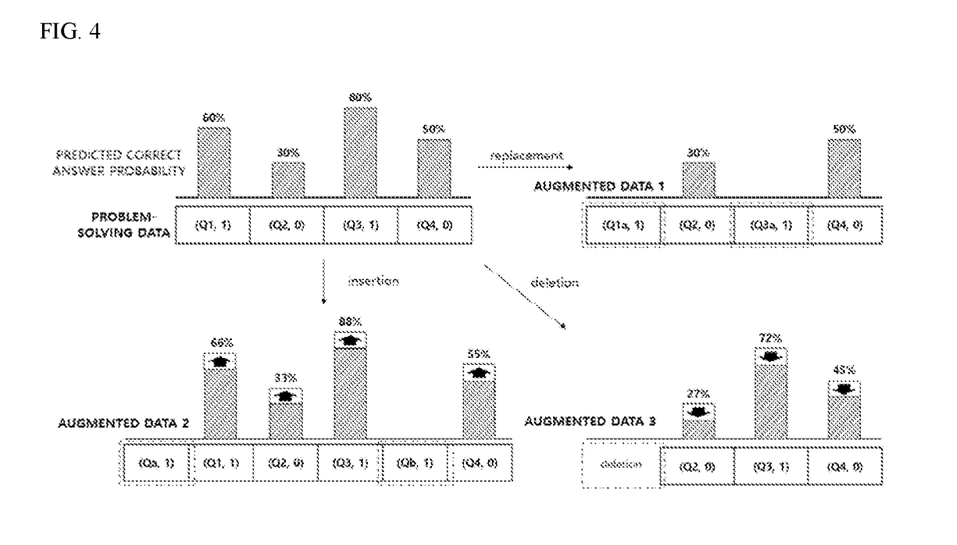
FIG. 4 is a diagram for describing data augmentations of a replacement, an insertion, and a deletion of problem-solving data.

FIG. 4 is a diagram for describing data augmentations of replacement, insertion, and deletion of problem-solving data.

Referring to FIG. 4, an example of augmented data being generated from problem-solving data on the basis of different data augmentation methods is illustrated.

Specifically, in FIG. 4, an example in which augmented data 1 is generated through replacement, augmented data 2 is generated through insertion, and augmented data 3 is generated through deletion on the basis of problem-solving data including four sets of problems and responses {(Q1,1), (Q2,0), (Q3,1), (Q4,0)} is illustrated.

In the problem-solving data, "1" may indicate a case that the corresponding problem is correctly answered by the user, and "0" may indicate a case that the corresponding problem is incorrectly answered by the user. That is, through the problem-solving records of the problem response data, it may be interpreted that problems Q1 and Q3 are answered correctly and problems Q2 and Q4 are answered incorrectly by the user.

The predicted correct answer probability may be the probability that the user correctly answers the corresponding problem predicted using the knowledge tracking model trained using the problem-solving data. As illustrated in FIG. 4, the knowledge tracking model has predicted that Q1 is correctly answered with a probability of 60%, Q2 is correctly answered with a probability of 30%, Q3 is correctly answered with a probability of 80%, and Q4 is correctly answered with a probability of 50%.

First, a process of generating augmented data 1 through replacement will be described.

The data augmentation performing unit may replace some of the problems solved by the user with similar problems. The similar problem may be a problem having the highest correct answer probability from artificial intelligence prediction, among problems included in a problem set having the same type and difficulty. However, the definition of similar problems is not limited thereto and may be defined in various ways according to embodiments.

Augmented data 1 is a case in which problems Q1 and Q3 are replaced with problems Q1a and Q3a, which are problems having the same type and difficulty as problems Q1 and Q3. Since the user has answered problems Q1 and Q3 correctly, problems Q1a and Q3a, which are similar problems, are also set to be correctly answered by the user, and (Q1,1) and (Q3,1) may be replaced with problem-solving records (Q1a,1) and (Q3a,1), respectively.

According to the replacement of the problem-solving data, new training data referred to as augmented data 1 may be generated.

Next, a process of generating augmented data 2 through insertion will be described.

The data augmentation performing unit may generate a virtual problem-solving record for a problem that has not been solved by the user, and insert the virtual problem-solving record into the existing problem-solving data. The problem-solving records to be inserted may be determined in various ways.

In an embodiment, the data augmentation performing unit may generate a problem-solving record to be inserted, by fixing the solving result of the user and extracting a random problem. For example, a problem-solving record to be inserted may be generated by fixing the solving result of the user to one of a case of correct ("1") or a case of incorrect ("0"), extracting a random problem from problems that have not been solved, and mapping the extracted random problem and the fixed solving result.

In the embodiment of FIG. 4, the solving result of the user is fixed to a case of correct ("1"), and problem-solving records (Qa,1) and (Qb,1) are generated by mapping problems Qa and Qb having not been solved by the user to the solving result "1."

The problem-solving data with the new problem-solving record inserted includes a larger number of correctly answered problems compared to the problem-solving data before the insertion. Therefore, the knowledge tracking model trained with augmented data 2 generated according to the insertion may output a higher correct answer probability for the same problem compared to the knowledge tracking model trained with the problem-solving data before the insertion.

Looking at augmented data 2, it can be seen that the predicted correct answer probability of each of the problems Q1 to Q4 is increased by 10% compared to that of the problem-solving data before the augmentation. According to the insertion of the problem-solving data, new training data referred to as augmented data 2 may be generated.

Next, a process of generating augmented data 3 through deletion will be described.

The data augmentation performing unit may delete a problem-solving record of the user from the existing problem-solving data. The problem-solving record to be deleted may be determined in various ways.

In an embodiment, the data augmentation performing unit may fix the solving result of the user and determine a problem-solving record of any one among problems having the fixed solving result as the problem-solving record to be deleted.

For example, the solving result of the user may be fixed to one of a case of correct ("1") and a case of incorrect ("0"), and at least one among arbitrary problem-solving records having the fixed solving result may be determined as the problem-solving record to be deleted.

In another embodiment, the data augmentation performing unit may determine the problem-solving records to be deleted in the order of the highest predicted correct answer probability from among the problems having the fixed solving result.

In FIG. 4, an example in which the solving result of the user is fixed to a case of correct ("1") and between the problem-solving records (Q1,1) and (Q3,1) having the fixed solving result "1", a problem-solving record (Q1,1) is determined as a problem-solving record to be deleted is illustrated.

The problem-solving data with some problem-solving records deleted includes a smaller number of correctly answered problems compared to the problem-solving data before the deletion. Therefore, the knowledge tracking model trained with augmented data 3 generated according to the deletion may output a lower correct answer probability for the same problem compared to the knowledge tracking model trained with the problem-solving data before the deletion.

Looking at augmented data 3, it can be seen that the predicted correct answer probability of each of the problems Q2 and Q3 is decreased by 10% compared to the case of the problem-solving data before the augmentation. According to the deletion of the problem-solving data, new training data referred to as augmented data 3 may be generated.

In the case of insertion and deletion, the data augmentation performing unit may perform monotonicity regularization of comparing the predicted correct answer probability of original problem-solving data with the predicted correct answer probability of newly generated augmented data, and assigning the model an inductive bias called monotonicity.

That is, on the assumption that a student who answers more problems correctly or fewer problems incorrectly has better skill, the model is allowed to adopt an inductive bias that the prediction value of the knowledge tracking model should increase as more and more problems are correctly answered using the monotonicity loss function.

Similarly, the assumption that a student who answers fewer answers correctly or more answers incorrectly has poor skill may be applied to the knowledge tracking model using a monotonicity regularization loss function.

Figure 5:
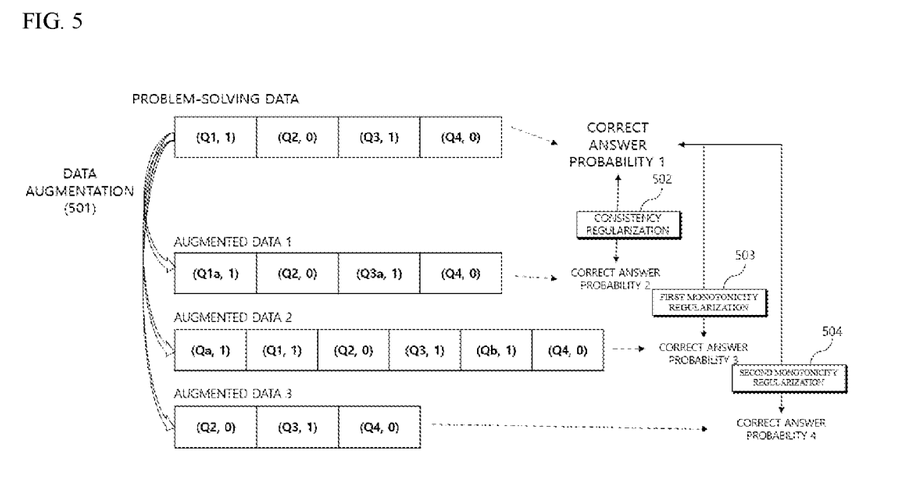
FIG. 5 is a diagram for describing a regularization operation according to a data augmentation method.

FIG. 5 is a diagram for describing a regularization operation according to a data augmentation method.

Referring to FIG. 5, a process of performing a regularization operation while training a knowledge tracking model with the augmented data generated in FIG. 4 is illustrated.

As described above in FIG. 4, problem-solving data may be converted through a data augmentation 501 to generate augmented data 1, augmented data 2, and augmented data 3.

The problem-solving data, augmented data 1, augmented data 2, and augmented data 3 are each used as training data of the artificial intelligence model so that the correct answer probability of the user in each case of the problem-solving data, augmented data 1, augmented data 2, and augmented data 3 may be predicted.

The predicted value of the model trained with the problem-solving data is correct answer probability 1, the predicted value of the model trained with augmented data 1 is correct answer probability 2, the predicted value of the model trained with the augmented data 2 is correct answer probability 3, and the predicted value of the model trained with augmented data 3 is correct answer probability 4.

Augmented data 1 generated by replacement may be subjected to parameter optimization through consistency regularization 502. A loss function may be applied in a direction to compare correct answer probability 1 with correct answer probability 2 and reduce the error, so that the knowledge tracking model may be trained.

As a result, augmented data 1 generated by replacement may be learned to output a correct answer probability within an error range significantly close to the problem-solving data.

Augmented data 2 generated by insertion may be subjected to parameter optimization through first monotonicity regularization 503.

Since augmented data 2 contains a larger number of problem-solving records about correctly answered problems compared to the problem-solving data before the augmentation, a loss function may be applied such that correct answer probability 3 has a higher predicted value compared to correct answer probability 1, so that the knowledge tracking model may be trained.

Augmented data 3 generated by deletion may be subjected to parameter optimization through second monotonicity regularization 504.

Since augmented data 3 contains a smaller number of problem-solving records about correctly answered problems compared to the problem-solving data before the augmentation, a loss function may be applied such that correct answer probability 4 has a lower predicted value compared to correct answer probability 1, so that the knowledge tracking model may be trained.

Figure 6:
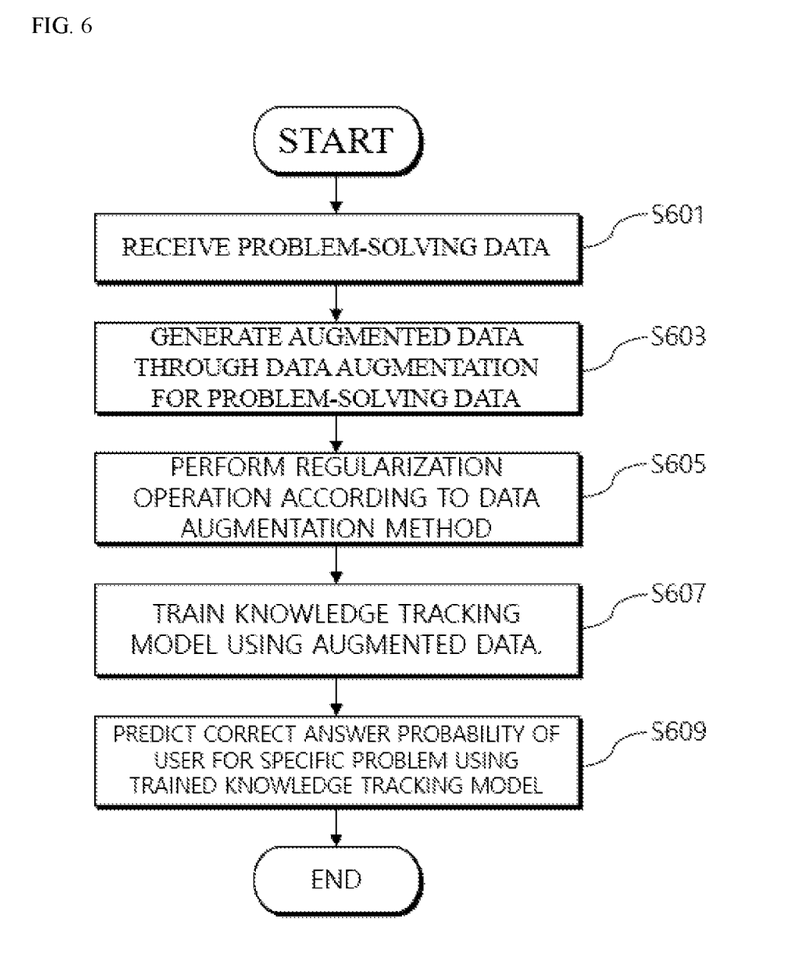
FIG. 6 is a flowchart for describing an operation method of an apparatus for training a knowledge tracking model according to an embodiment of the present invention.

FIG. 6 is a flowchart for describing an operation method of an apparatus for training a knowledge tracking model according to an embodiment of the present invention.

Referring to FIG. 6, in operation S601, the apparatus for training a knowledge tracking model may receive problem-solving data from the user terminal. Alternatively, the apparatus for training a knowledge tracking model may receive problem-solving data directly from the administrator and store the received problem-solving data as data for model training.

In operation S603, the apparatus for training a knowledge tracking model may generate augmented data through a data augmentation for the problem-solving data. The knowledge tracking model trained with the existing problem-solving data may be additionally trained with the augmented data and thus have improved predictive performance.

In operation S605, the apparatus for training the knowledge tracking model may perform a regularization operation according to an augmentation method used for the data augmentation. The regularization operation may be performed using a consistency regularization loss function in the case of the augmented data generated by replacement. The regularization operation may be performed using a monotonicity regularization loss function in the case of the augmented data generated by insertion or deletion.

In operation S607, the knowledge tracking model training apparatus may train the knowledge tracking model using the augmented data.

Specifically, the knowledge tracking model training apparatus may input the augmented data to the knowledge tracking model, and allow the knowledge tracking model to learn a weight representing the relationship between the problem-solving record and the correct answer probability of the user included in the augmented data. The knowledge tracking model may predict the correct answer probability of the user for a specific problem on the basis of the weight determined as a result of training.

In operation S609, the knowledge tracking model training apparatus may predict the correct answer probability of the user for a specific problem using the trained knowledge tracking model.

Figure 7:
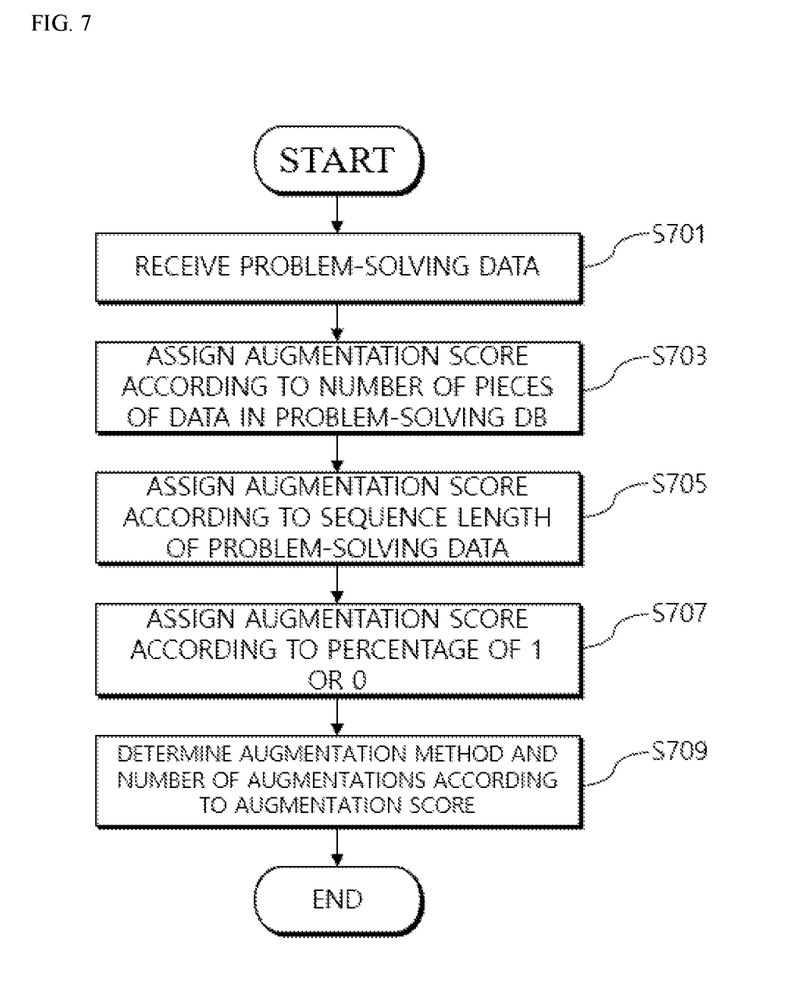
FIG. 7 is a flowchart for describing an embodiment in which the augmentation method and the number of augmentations are determined according to an assigned augmentation score.

FIG. 7 is a flowchart for describing an embodiment in which the augmentation method and the number of augmentations are determined according to an assigned augmentation score.

Referring to FIG. 7, in operation S701, the apparatus for training a knowledge tracking model may receive problem-solving data from the user terminal.

In operation S703, the apparatus for training a knowledge tracking model may assign an augmentation score according to the number of pieces of data in the problem-solving database. The augmentation score may be used as an index for determining the augmentation method and the number of augmentations. The problem-solving database may refer to a problem solving information storage unit.

In operation S705, the apparatus for training a knowledge tracking model may assign an augmentation score according to the sequence length of the problem-solving data.

In operation S707, the apparatus for training a knowledge tracking model may assign an augmentation score according to the percentage of 1 or 0 of the problem-solving data. 1 may indicate a case in which the user answered the problem correctly, and 0 may indicate a case in which the user answered the problem incorrectly.

In operation S709, the apparatus for training a knowledge tracking model may determine the augmentation method and the number of augmentations according to the augmentation score assigned in operations S703 to S707. In an embodiment, some of operations S703 to S707 may be omitted. The augmentation method may include at least one of replacement, insertion, and deletion, and one or more augmentation methods may be performed in combination.

Figure 8:
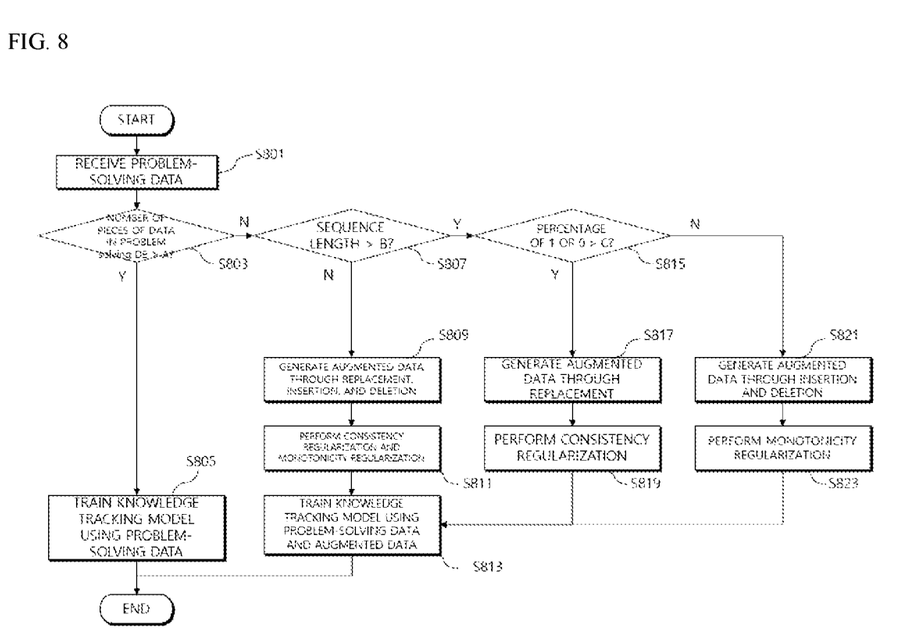
FIG. 8 is a flowchart for describing another embodiment in which a data augmentation method is determined according to an overfitting factor that may affect the predictive performance of a model.

FIG. 8 is a flowchart for describing another embodiment in which a data augmentation method is determined according to an overfitting factor that may affect the predictive performance of a model.

Referring to FIG. 8, in operation S801, the apparatus for training a knowledge tracking model may receive problem-solving data from the user terminal.

In operation S803, the apparatus for training a knowledge tracking model may determine whether to perform a data augmentation according to the number of pieces of data in the problem-solving database. For example, in operation S805, the apparatus for training a knowledge tracking model may, when the number of pieces of data is greater than a first reference value A, omit the data augmentation and train the knowledge tracking model using the problem-solving data.

The apparatus for training a knowledge tracking model may, when the number of pieces of data in the problem-solving database is smaller than the first reference value A, perform operation S807.

In operation S807, the apparatus for training a knowledge tracking model may determine whether the sequence length of the problem-solving data is greater than a second reference value B.

The apparatus for training a knowledge tracking model may, when the sequence length of the problem-solving data is smaller than the second reference value B, perform operation S809. The apparatus for training a knowledge tracking model may, when the sequence length of the problem-solving data is greater than the second reference value B, perform operation S815.

In operation S809, the apparatus for training a knowledge tracking model may generate augmented data through data augmentations of replacement, insertion, and deletion. When the sequence length is smaller than the second reference value B, it may be determined that the knowledge tracking model may not be trained sufficient to predict the correct answer probability with a desired accuracy. Therefore, replacement, insertion, and deletion are performed to generate three or more pieces of augmented data from one piece of problem-solving data.

In operation S811, a regularization operation may be performed according to an augmentation method in which the augmented data is generated. In the case of replacement, consistency regularization may be performed, and in the case of insertion and deletion, monotonicity regularization may be performed.

Thereafter, in operation S813, the apparatus for training a knowledge tracking model may train the knowledge tracking model using the problem-solving data and the augmented data.

When the sequence length is greater than the second reference value B, operation S815 may be performed. In operation S815, the apparatus for training a knowledge tracking model may determine whether the percentage of 1 or 0 of the problem-solving data is greater than a third reference value C.

When the percentage of one of the responses is greater than a reference value, the student's skill is above or below the average. In this case, the apparatus for training a knowledge tracking model may determine that the prediction accuracy may be high when augmented data is generated through replacement.

Accordingly, the apparatus for training a knowledge tracking model may train the knowledge tracking model by performing operations S817, S819, and S813.

Conversely, when the percentage of one of the responses is smaller than the reference value, the student's skill may be at an average level. In this case, the apparatus for training a knowledge tracking model may determine that the prediction accuracy may be high when augmented data is generated through insertion or deletion.

Accordingly, the apparatus for training a knowledge tracking model may train the knowledge tracking model by performing operations S821, S823, and S813. However, according to an embodiment, insertion or deletion may be performed when the percentage of 1 or 0 is greater than the third reference value, and insertion may be performed when the percentage of 1 or 0 is smaller than the third reference value.

As is apparent from the above, the apparatus and system for training a knowledge tracking model and the operation method thereof can resolve the overfitting of a knowledge tracking model and increase prediction performance by replacing each problem of collected problem-solving data with a predetermined probability, or inserting or deleting a specific problem-solving record to generate new training data.

The apparatus and system for training a knowledge tracking model and the operation method thereof can resolve the overfitting of a knowledge tracking model and increase the prediction performance by defining a regularization loss function according to a data augmentation method, comparing a model prediction value through the original problem-solving data with a model prediction value through augmented data, and performing regularization.

In addition, the apparatus and system for training a knowledge tracking model and the operation method thereof can resolve the overfitting more effectively by determining the data augmentation method or the number of augmentations according to overfitting factors that may affect the predictive performance of a model, such as the number of pieces of data in a problem-solving database, a sequence length of problem-solving data, and the percentage of 1 or 0.

Specific embodiments are shown by way of example in the specification and the drawings and are merely intended to aid in the explanation and understanding of the technical spirit of the present invention rather than limiting the scope of the present invention. Those of ordinary skill in the technical field to which the present invention pertains should be able to understand that various modifications and alterations may be made without departing from the technical spirit or essential features of the present invention.

What is claimed is:

1. An apparatus for training a knowledge tracking model, the apparatus comprising:
  a processor; and a memory storing instructions executable by the processor, wherein the processor is configured to:

store problem-solving data in which a problem solved by a user and a response of the user to the problem are mapped, receive the problem-solving data, determine an augmentation score on the basis of the problem-solving data, the augmentation score being determined corresponding to a percentage of correct answers or incorrect answers of the problems solved by the user, set a data augmentation method on the basis of the augmentation score, and convert the problem-solving data on the basis of the data augmentation method to generate augmented data, wherein the data augmentation method includes 1) replacement, 2) insertion, and 3) deletion, wherein the processor is further configured to:

(1) generate first augmented data when the data augmentation method is the replacement, (2) generate second augmented data when the data augmentation method is the insertion, and (3) generate third augmented data when the data augmentation method is the deletion, receive the augmented data and perform a regularization operation using a regularization loss function on the basis of the data augmentation method, input the augmented data to a knowledge tracking model, allow the knowledge tracking model to learn a weight representing a relationship between a problem-solving record included in the augmented data and a correct answer probability of the user, and train the knowledge tracking model for predicting a correct answer probability of the user for a specific problem on the basis of the weight, and predict the correct answer probability of the user for the specific problem through the knowledge tracking model trained on the basis of the problem-solving data and the augmented data, and wherein the processor is further configured to:

(1) allow the knowledge tracking model to learn the first augmented data using a consistency regularization loss function to compare a first correct answer probability predicted through the problem-solving data with a second correct answer probability predicted through the first augmented data, and train the knowledge tracking model in a direction to reduce a difference between the first correct answer probability and the second correct answer probability, (2) allow the knowledge tracking model to learn the second augmented data using a first monotonicity regularization loss function to compare the first correct answer probability with a third correct answer probability predicted through the second augmented data, and train the knowledge tracking model with the first monotonicity regularization loss function applied thereto such that the third correct answer probability has a higher predictive value compared to the first correct answer probability, and (3) allow the knowledge tracking model to learn the third augmented data using a second monotonicity regularization loss function to compare the first correct answer probability with a fourth correct answer probability predicted through the third augmented data, and train the knowledge tracking model with the second monotonicity regularization loss function applied thereto such that the fourth correct answer probability has a lower predictive value compared to the first correct answer probability.

2. The apparatus of claim 1, wherein the processor is further configured to replace some or all of problem-solving records of the problem-solving data with a similar problem that has not been actually solved by the user with a predetermined probability, to generate the augmented data.

3. The apparatus of claim 2, wherein the similar problem that has not been actually solved by the user is a problem, among problems included in a problem set having the same type and difficulty as a problem to be replaced, which has a highest correct answer probability as a result of artificial intelligence prediction.

4. The apparatus of claim 3, wherein the processor is further configured to insert a virtual problem-solving record associated with a problem that has not been solved by the user into the problem-solving data to generate the augmented data, or delete some or all of the problem-solving records included in the problem-solving data to generate the augmented data.

5. The apparatus of claim 4, wherein the processor is further configured to select at least one data augmentation method among the replacement, the insertion, and the deletion according to a factor that causes overfitting of the knowledge tracking model, and the factor that causes the overfitting includes at least one of a number of pieces of data in a problem-solving database, a sequence length of the problem-solving data, and a percentage of 1 or 0 in the problem-solving data.

6. An operation method of an apparatus for training a knowledge tracking model, which is an apparatus for predicting a correct answer probability of a user on the basis of data augmentation, the method comprising:

receiving problem-solving data in which a problem solved by a user and a response of the user to the problem are mapped and storing the problem-solving data;

determining an augmentation score on the basis of the problem-solving data, the augmentation score being determined corresponding to a percentage of correct answers or incorrect answers of the problems solved by the user;

setting a data augmentation method on the basis of the augmentation score;

converting the problem-solving data on the basis of the data augmentation method to generate augmented data, wherein the data augmentation method includes 1) replacement, 2) insertion, and 3) deletion, and (1) first augmented data is generated when the data augmentation method is the replacement, (2) second augmented data is generated when the data augmentation method is the insertion, and (3) third augmented data is generated when the data augmentation method is the deletion;

performing a regularization operation on the basis of the data augmentation method;

inputting the augmented data to a knowledge tracking model, allowing the knowledge tracking model to learn a weight representing a relationship between a problem-solving record included in the augmented data and a correct answer probability of the user, and training the knowledge tracking model for predicting a correct answer probability of the user for a specific problem on the basis of the weight; and predicting the correct answer probability of the user for the specific problem through the knowledge tracking model trained on the basis of the problem-solving data and the augmented data, wherein the training of the knowledge tracking model further includes:

(1) allowing the knowledge tracking model to learn the first augmented data using a consistency regularization loss function to compare a first correct answer probability predicted through the problem-solving data with a second correct answer probability predicted through the first augmented data, and training the knowledge tracking model in a direction to reduce a difference between the first correct answer probability and the second correct answer probability;

(2) allowing the knowledge tracking model to learn the second augmented data using a first monotonicity regularization loss function to compare the first correct answer probability with a third correct answer probability predicted through the second augmented data, and training the knowledge tracking model with the first monotonicity regularization loss function applied thereto such that the third correct answer probability has a higher predictive value compared to the first correct answer probability; and (3) allowing the knowledge tracking model to learn the third augmented data using a second monotonicity regularization loss function to compare the first correct answer probability with a fourth correct answer probability predicted through the third augmented data, and training the knowledge tracking model with the second monotonicity regularization loss function applied thereto such that the fourth correct answer probability has a lower predictive value compared to the first correct answer probability.

* * * * *